No. 648,352. Patented Apr. 24, 1900.
E. A. BLANTON, Jr.
CONNECTION FOR SHAFTS AND HUBS.
(Application filed Apr. 19, 1898.)
(No Model.)
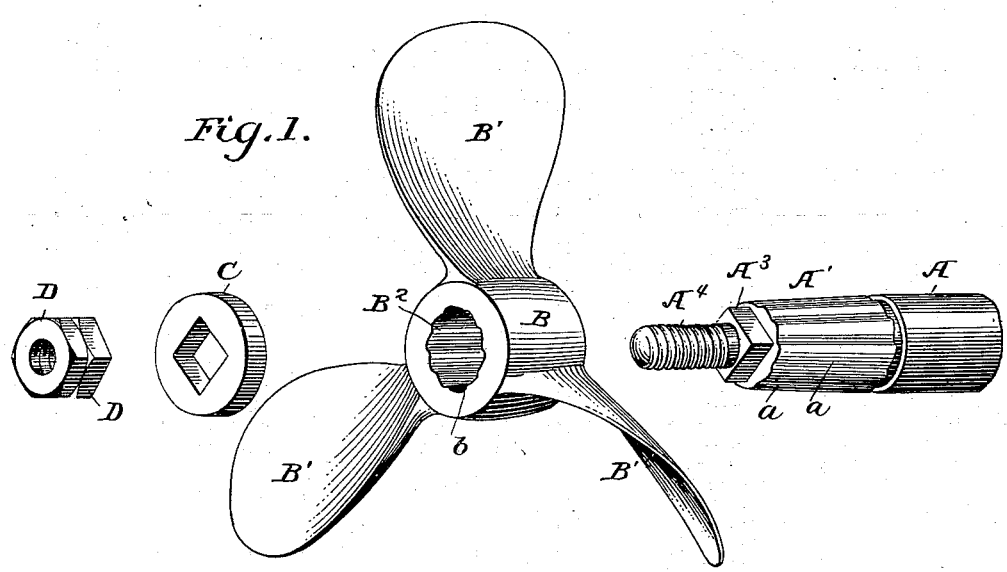
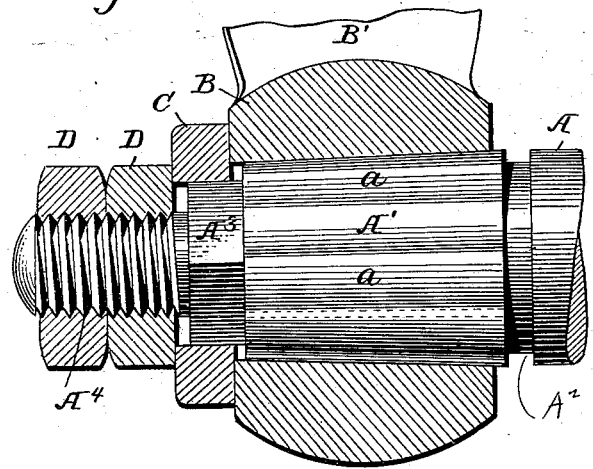
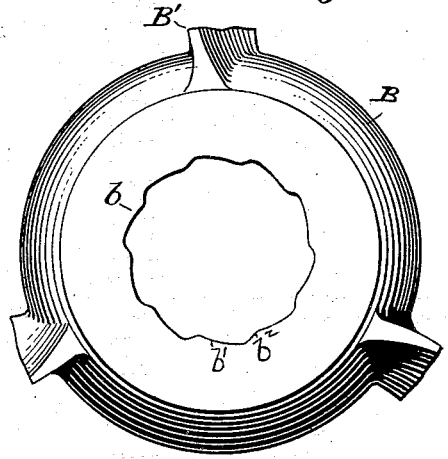
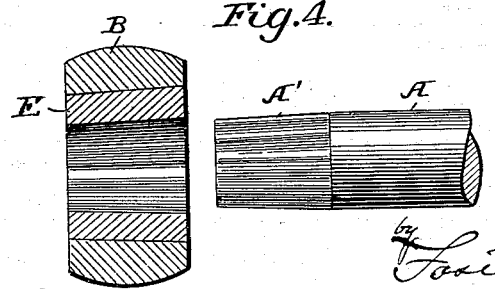

UNITED STATES PATENT OFFICE.

EDWARD A. BLANTON, JR., OF RIDLEY PARK, PENNSYLVANIA.

CONNECTION FOR SHAFTS AND HUBS.

SPECIFICATION forming part of Letters Patent No. 648,352, dated April 24, 1900.

Application filed April 19, 1898. Serial No. 678,177. (No model.)

*To all whom it may concern:*

Be it known that I, EDWARD A. BLANTON, Jr., a citizen of the United States, residing at Ridley Park, in the county of Delaware and State of Pennsylvania, have invented certain new and useful Improvements in Connections for Shafts and Hubs, of which the following is a specification.

My invention relates to means for securing hubs, sleeves, and similar devices to shafts and the like, and has for its object to provide means whereby what is generally known as a "forced fit" between the parts may be secured in a substantial and improved manner and whereby the objections to such constructions can be avoided; and to these ends my invention consists in the various features of construction and arrangement of parts, substantially as hereinafter more particularly set forth.

In the accompanying drawings, Figure 1 shows an embodiment of my invention as applied to a propeller-blade and shaft, the parts being displayed in perspective for purposes of clearness. Fig. 2 is a longitudinal vertical section, on an enlarged scale, showing the parts assembled, the blades being broken away. Fig. 3 is a plan view of the hub, on an enlarged scale, parts being broken away; and Fig. 4 is a longitudinal vertical section showing a modification.

In my Patent No. 581,476, granted April 27, 1897, I have shown, described, and claimed a means for securing cams or hubs upon shafts, in which, among other things, the shaft was provided with a series of curved wedge-shaped bosses arranged in a circumferential line around the shaft and the hub was provided with a similar series of recesses or bosses and was adapted to be tightened upon the shaft by turning on said bosses, and in my Patent No. 601,232, granted March 29, 1898, I have shown, described, and claimed an extension of this broad invention whereby the general principles thereof are adapted to a coupling for shafts and similar devices, and in my application, Serial No. 666,935, filed January 17, 1898, I have shown a further extension of the general principles of the invention in connection with the use of filling-pieces, and my present invention may be said to be a further improvement and extension of the broad principles of construction involved in said patents and application.

It is well known that in many cases it is desirable to apply hubs, sleeves, and the like to shafts and similar constructions in order to get what is ordinarily understood as a "forced fit," and in these constructions the opening in the hub or sleeve and portion of the shaft or other construction to which the hub is applied is usually made tapering, and this kind of attachment is used for many and various purposes—such, for instance, as attaching a propeller-blade to its driving-shaft— and I will illustrate my invention in connection with such a construction, although, of course, it will be understood that the invention can be applied to many and various uses for which it is adapted by those skilled in the art without departing from the spirit of the invention.

In the drawings, A represents the shaft or other device to which the hub or sleeve of a propeller, pulley, or other similar construction is to be attached. The end A' is shown as being tapered longitudinally toward its end, and it is provided with a series of wedge-shaped portions a, extending longitudinally of the tapered surface and arranged circumferentially around the same and preferably occupying the whole of the circumference. The tapering portion A' of the shaft may be provided with any desired number of wedge-shaped portions a, according to the size and the wishes of the constructor, there being shown ten in the present instance, which I have found to be a satisfactory number in most instances, and these wedge-shaped portions are of uniform size, although of course they may be of varying sizes and be variously arranged with relation to each other. The outer surfaces of these wedge-shaped portions or bosses a are preferably on curves having gradually-increasing radii measured from the center of the shaft, either in the form of true eccentrics or involute curves or otherwise, while the point of junction between the high part of one wedge-shaped portion and the low part of another is preferably curved, forming what may be termed a substantially "ogee" curve, having radii less than the radii of the outer curved surfaces, and while this is the preferred construction it is evident that the shape of this portion can be varied without materially affecting the essence of the invention. It will thus be seen that in the embodiment shown there are a series of longitudinally-tapering curved portions or bosses $a$, arranged or formed symmetrically on the tapered portion $A'$ of the shaft, and at the point of junction of these tapered portions with the main body of the shaft I find it convenient to make a groove $A^2$ of a depth corresponding substantially with the low portions of the bosses, although this is a mere refinement and not necessary in utilizing my invention.

The hub, sleeve, or other similar portion B may, as in the present instance, be provided with blades $B'$ or any other attachment, preferably formed integral therewith, although they may be otherwise attached, and the hub or sleeve is recessed at $B^2$ with a taper corresponding substantially with the taper of the curved portions or bosses on the shaft and is provided with a series of recesses or bosses $b$, the counterpart of the curved portions or bosses $a$ on the shaft. The curved surfaces $b'$ of the recesses are made to correspond practically with the outer curved surfaces on the shaft, and the low portions $b^2$ are the counterpart of the high portions, and the curve joining the high and low portions of the recesses is similar to the curve joining the high and low portions of the bosses on the shaft, so that when the hub is in place on the shaft it will accurately fit the same, resulting in an even pressure or strain throughout all parts of the hub, avoiding the tendency to burst the same through uneven stresses. The recess is of such a size with relation to the tapered portion of the shaft that the hub can be slipped the greater portion of its length into position without difficulty, and in applying the parts to each other it is preferable to arrange them so that the high portions of the shaft will fit and bear against the low portions $b^2$ of the recesses, the bosses on the hub leaving a clearance between the outer curved portions of the shaft and the curved surface $b'$ of the hub, and as the tapered portion of the shaft enters the hub this clearance is gradually taken up and the hub becomes self-tightening upon the shaft and the two can be forced together under a moderate pressure, if desired, securing a practical and substantial forced fit. In order to maintain the parts in this position, some means of external attachment may be used, and I have shown one simple means comprising the washer C, adapted to fit the squared portion $A^3$, and set-nuts D D, adapted to fit the screw-threaded portion $A^4$ of the shaft, and while in many instances this is not necessary in other instances it is desirable to have some such means of attachment to prevent any accidental loosening of the hub on the shaft which would disturb the relations of the parts.

In Fig. 4 I have illustrated another example of the use of my invention, wherein the shaft A has a longitudinally-tapering portion $A'$ and the hub B has a correspondingly-tapering socket and is provided with a coupling-piece E, having wedge-shaped portions both internally and externally and adapted to fit the tapered portion of the shaft.

It is not deemed necessary to show other applications of the invention, as the general principles thereof will be clearly understood from what has been set forth, and perhaps it may be well to briefly set forth some of the advantages of this construction over the well-known means of applying hubs or sleeves in a somewhat similar way.

In an ordinary forced fit between a tapering shaft and hub the parts are held together and driven simply by friction between the two surfaces, and if for any reason the parts change their relative positions in any manner they become quite free and there is no condition present which tends to restore the parts to their locking positions, and this kind of a conical forced fit is not positive and is unreliable. To overcome this objection, it has been common to use a key or feather interposed between the parts, and the use of such a key converts the combination into a more positive connection; but any change in the relative longitudinal positions of the parts will result in slackness and lost motion, and this lost motion, as in a case where no key is used, will result in wear on the bearing-surfaces of all the parts, including the key, and therefore in gradual increase of the lost motion, and these would react on each other and continue until the stresses resulting from the pressure of lost motion might be enough to shear the key or feather. Moreover, the use of a key creates a stress on the hub and localizes this stress at the key-seat and on the bearing in a line diametrically opposite thereto, and this is a disadvantage which is well recognized by engineers. Moreover, the process of shrinking the parts together or forcing them together by hydraulic or screw pressure necessitates great accuracy in the boring and turning of the parts to be assembled and requires heavy and bulky machinery, and as this often has to be done after the parts are assembled for direction at its destination it is further objectionable.

With my improved form—that is, with a number of bosses or with curved faces equally distributed around the periphery of the tapered portion of the shaft and corresponding bosses or recesses in the hub—the conditions are entirely changed. In the first place the connection between the two parts is absolutely positive regardless of the direction of rotation, and this without the addition of any third part, and in the event of any change taking place in the relative longitudinal positions of the two parts within certain limits, depending upon the degree of the taper, size of cam, &c., the connection is self-tightening. This is true in both directions of rotation, for while in the normal direction of rotation the outer curved surface of the shaft and the surface $b'$ of the hub have a longer bearing-surface and more gradual tightening effect the curved portions between the high and low parts of the bosses $a$ also act as self-tightening connections to a greater or less extent. It is to be observed that in many applications of the invention the direction of rotation is very largely uniform, although there may be occasion to reverse the direction of rotation of the shaft, and all this is provided for in my construction. It will be observed that my method of connecting the parts produces a practically-equal distribution of the total driving stress around the hub instead of (as in the case of existing methods) concentrating the stress at certain points, and if perchance there should be any looseness the tendency is to a self-tightening of the parts, so as to render them operative under these conditions.

Having thus described my invention, what I claim is—

1. The combination with a shaft having self-tightening bosses tapering longitudinally, the outer faces of which bosses are on curves having gradually-increasing radii, measured from the center of the shaft, of a hub having complementary bosses similarly tapering, substantially as described.

2. The combination of a hub and shaft having self-tightening bosses tapering longitudinally, the outer faces of which bosses are on curves having gradually-increasing radii, measured from the center of the shaft, the hub being provided with a coupling-piece having complementary bosses similarly tapering, substantially as described.

3. The combination with a shaft having self-tightening bosses tapering longitudinally the outer faces of which bosses are on curves having gradually-increasing radii, measured from the center of the shaft and arranged circumferentially around the shaft, of a hub having complementary bosses similarly tapering, and mechanical means for securing the two together, substantially as described.

In testimony whereof I have signed my name to this specification in the presence of two subscribing witnesses.

EDWARD A. BLANTON, JR.

Witnesses:
H. B. COLLINS,
ROBERT L. MORGAN.